Jan. 21, 1941.  C. E. MASON  2,229,418
REDUCING VALVE
Filed Jan. 13, 1938
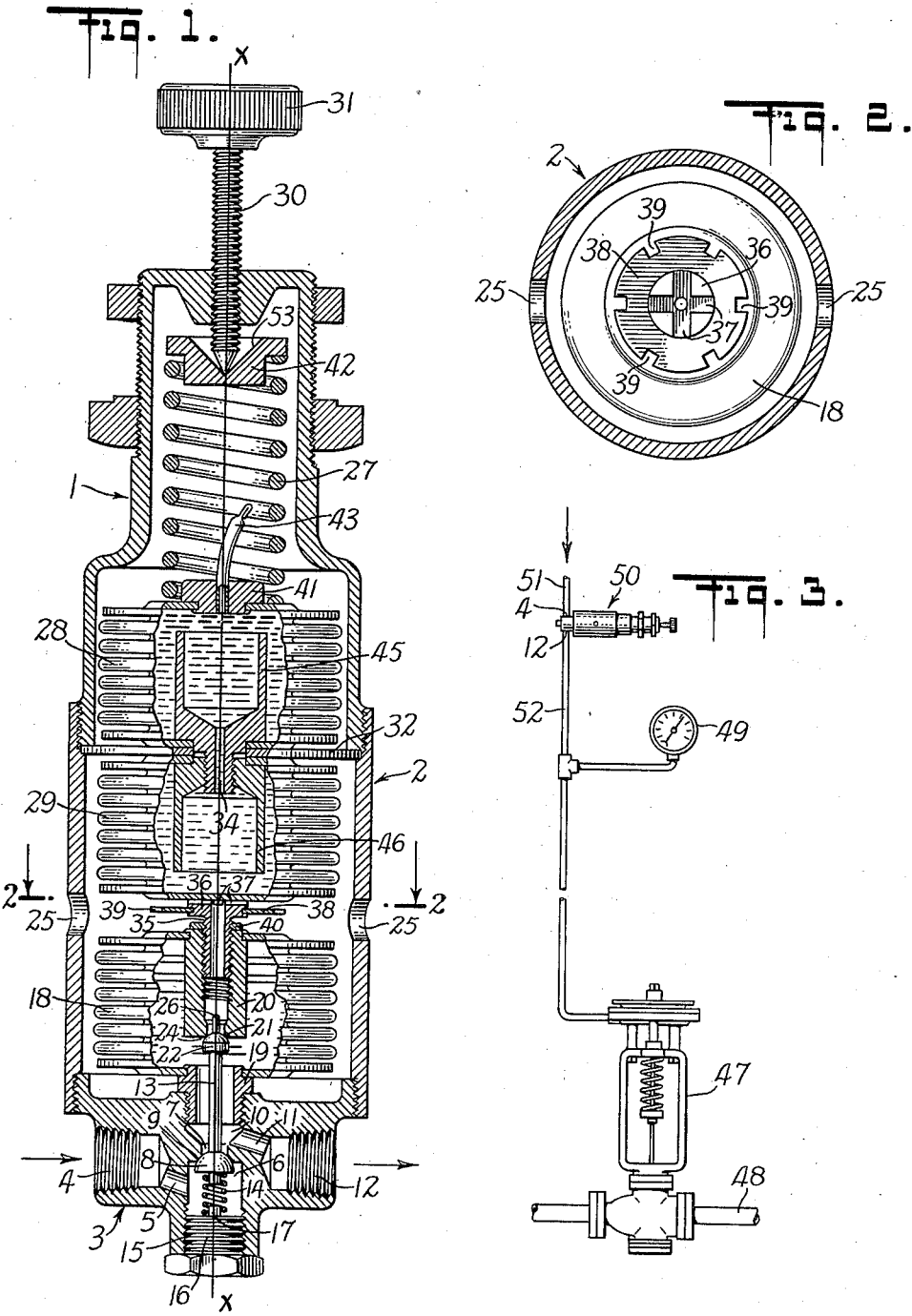
INVENTOR
Clesson E. Mason
BY
Blair, Curtis, Dunne & Hayward
ATTORNEYS Patented Jan. 21, 1941

2,229,418

UNITED STATES PATENT OFFICE 2,229,418

REDUCING VALVE

Clesson E. Mason, Foxboro, Mass., assignor to The Foxboro Company, Foxboro, Mass., a corporation of Massachusetts Application January 13, 1938, Serial No. 184,745

11 Claims. (Cl. 50—10)

This invention relates to fluid pressure regulating apparatus. The embodiment chosen to illustrate the invention is an air-pressure reducing valve of a type adapted to maintain the air pressure in a dead end system at any desired pressure below that of the supply. Such types of reducing valves as have been known to the art have been subject to numerous disadvantages and difficulties. They have been relatively insensitive to changes in pressure and slow in attaining new pressure settings as well as being affected in their adjustments by variations in the supply pressure. Attempts to overcome such disadvantages by making the valve more sensitive and more rapid have resulted in constructions in which the elements of the valve vibrated constantly and soon rendered the devices inoperative.

It is an object of this invention to provide an improved fluid pressure reducing valve of this type. This and other objects may best be appreciated by reference to the accompanying drawing, in which:

Figure 1 is a cross-sectional view of a valve structure embodying this invention taken along the longitudinal axis;

Figure 2 is a cross-section of the valve taken substantially on the line 2—2 of Figure 1; and in which Figure 3 illustrates schematically one application of the valve illustrated in Figure 1.

Referring to Figure 1, the valve structure has a valve casing comprising three parts; a bonnet section generally indicated at 1 suitably threaded into a sleeve portion generally indicated at 2, which in turn threadedly receives a valve body generally indicated at 3.

Supply air enters the valve body through a threaded inlet 4 and flows through a short passage 5 into a valve inlet chamber 6. Thence the air flows past a valve seat 9 and its associated valve head 8 of a valve 7 and enters a valve outlet chamber 10. Outlet chamber 10 is connected through passage 11 and outlet opening 12 to a closed system in which a desired dead end pressure is to be maintained. Valve stem 13 and valve heads 8 and 22 may be removed for cleaning and inspection through an opening 15 which is normally closed by a threaded plug 16 at the bottom of valve body 3. A spring 14 positioned by a reduced portion 17 of the plug 16 tends to force valve head 8 against valve seat 9. Valve head 8 is hemispherically shaped in order to ensure proper seating of the valve when valve stem 13 is not precisely aligned with the axis X—X of the valve structure.

The valve outlet chamber 10 communicates with a sensitive diaphragm or bellows 18 by means of a connecting sleeve 19 which is co-axial with the longitudinal axis X—X of the valve structure. Sleeve 19 is rigidly attached at its upper end to bellows 18 and at its lower end is threaded to the valve body 3. A tube 20 located within bellows 18 is rigidly secured at its upper extremity to the movable end of bellows 18 and at its lower extremity forms a valve seat 21 which coacts with valve head 22 to form a waste valve 24. Valve head 22 is rigidly connected to valve head 8 by valve stem 13. The interior of the bellows 18 communicates with the atmosphere through waste valve 24, tube 20 and holes 25 located in the sleeve portion 2. An extension 26 of the valve stem 13 extends upwardly into tube 20 and serves to maintain valve head 22 in operative relation to valve seat 21. Valve 24, like valve 7, is hemispherically shaped to ensure proper seating thereof.

From the above description it will be apparent that the air or gas pressure within the bellows 18 is the same as the output pressure and hence the upward force exerted on the movable end of bellows 18 is proportional to the output pressure at all times. If the output pressure drops below the desired value, the valve 7 tends to open and admit supply air to the system; if the output pressure rises above the desired value, valve 24 tends to open and allow air to escape from the system.

Downward pressure is exerted on the free end of bellows 18 by the spring 27 acting through the two interconnected bellows 28 and 29. These two bellows or diaphragms 28 and 29 are of like construction and are fastened to opposite sides of plate 32 which is clamped at the threaded juncture of the bonnet 1 and the sleeve portion 2. The bellows 28 and 29 are completely filled with a non-compressible fluid through the filling tip 43, and are interconnected by a tube 34 of small diameter, which serves to restrict the passage of liquid from one bellows to the other. A pair of stops 45 and 46 are provided within the bellows to prevent excessive contraction thereof.

The movable end of bellows 29 exerts pressure against the movable end of bellows 18 through a head 36 having a downwardly extending portion of reduced diameter 35 which is threaded to the inside of tube 20. The head 36 (see Figure 2)

is provided with radial slots 37 to permit escape of air from the waste valve 24.

A disc 38 with a plurality of notches 39 spaced about its circumference is secured to the head 36. These notches 39 permit the disc 38 to be rotated by means of a small tool inserted through one of the openings 25 in the sleeve portion 2. In this way, the distance between the free end of the bellows 29 and 18 may be adjusted. A nut 40 is provided on the threaded portion of tube 35 to lock it in position and thus prevent it from rotating after the adjustment has been made.

The head 36 is made adjustable in order to allow for manufacturing tolerances and possible variations in the distance from the free end of bellows 28 to the free end of bellows 29 due to expansion or contraction of the fluid contained therein.

The spring 27 is kept in alignment by a projecting portion 41 rigidly attached to the movable end of bellows 28. The force exerted on bellows 28 by spring 27 may be varied by rotation of a control knob 31 secured to a shaft 30 which is threaded down through the bonnet. Shaft 30 bears against an indentation 51 in the upper surface of a plug 42 which fits loosely into the top of spring 27.

From the above description it will be evident that the force exerted on the movable end of diaphragm 18, the force exerted by diaphragm 18 on the movable end of bellows 29, and the hydraulic pressure within bellows 29 are each proportional to the output pressure. Since the total travel of the free end of bellows 28 is small in relation to the length of spring 27, the hydraulic pressure in bellows 28 will be substantially constant except insofar as it is altered by adjustment of the knob 31. It will also be apparent that whenever the hydraulic pressures in bellows 28 and 29 are equal the free end of bellows 18 and consequently valve seat 21 will assume substantially the same position irrespective of the absolute values of the hydraulic pressures. The valve stem 13 is made of such a length that when the pressures in bellows 28 and 29 are equal both supply valve 8 and waste valve 24 will be closed. It is thus apparent that for any particular setting of the knob 31, there will be only one value of the output pressure which will cause diaphragm 18 to assume a position such that both valve 8 and valve 24 are closed, and when the output pressure is at that value, the hydraulic pressures in bellows 28 and 29 will be equal.

If for some reason the output pressure rises above the desired value, the hydraulic pressure in bellows 29 will be increased proportionally and liquid will begin to flow from bellows 29 to bellows 28 through the restricted connection 34. Valve seat 24 will be raised thus allowing fluid from the system to escape to the atmosphere. Since there is a constricted connection between bellows 28 and 29, the rate at which liquid flows from one bellows to the other depends upon the difference in hydraulic pressure between the two bellows. It is thus apparent that the rate at which the valves 8 and 24 open or close depends upon the magnitude of the deviation of the output pressure from the desired value. As either valve closes the rate of closure is continually reduced and approaches zero along an asymptotic curve. When the valve is used to control pressure in a dead end system the rate of change of the output pressure will also approach zero along a similar asymptotic curve.

One important aspect of the present invention is the kind of control exercised over the rate at which the valve can move. In the reducing valve above described, the diaphragm responsive to the pressure being controlled is made quite sensitive so that it responds to minute changes in pressure. However, in the absence of any retarding effect, such a diaphragm and associated valve mechanism tends to oscillate rapidly. Such oscillation causes rapid wearing of the valve parts and consequent inaccuracies in the maintenance of a constant dead end pressure. In the present invention, this high frequency oscillation is eliminated without adding inertia or friction to the sensitive diaphragm and consequently without impairing its sensitivity. This is accomplished by forcing the sensitive diaphragm to carry with it a hydraulically damped diaphragm which does no work, has substantially no friction, and a negligible spring characteristic. Although more desired pressure may be attained somewhat more slowly with such a construction, this retardation is not a practical hindrance. Hence, the construction here shown provides for maximum sensitivity without the objectionable oscillation, while at the same time the desired pressure is rapidly attained.

Figure 3 illustrates a type of dead end system adapted to be controlled by a reducing valve embodying this invention. This system contemplates the accurate remote control of an air-pressure controlled valve by a reducing valve. High-pressure air is supplied from a source through the pipe 51 to the inlet 4 of the reducing valve (generally indicated at 50) through which it passes to the outlet 12 and through the pipe 52 to a diaphragm-motor operated valve 47 controlling flow through a pipe 48. Gage 49 indicates the control pressure existing in the closed system. With a reducing valve of the type herein described, it is possible to adjust the pressure on the diaphragm of the valve 47, for example, to within one-quarter of an inch of water or less when the supply pressure is in the neighborhood of 20 pounds, to bring the output pressure rapidly to the control point, and to maintain the desired adjustment substantially constant without fluttering or vibration of the valve assembly 13.

As many embodiments may be made of the above invention, and as many changes might be made in the embodiment above described, it is to be understood that all matter hereinbefore set forth or shown in the accompanying drawing is to be interpreted as illustrative only and not in a limiting sense.

I claim:

1. A pressure control device, comprising, in combination, an inlet valve and a valve seat therefor, a waste valve and a valve seat therefor, said valves being mounted on a common valve stem with their respective valve seats so positioned as to make it impossible for them to open simultaneously, a diaphragm exposed to the outlet pressure of said device exerting a force proportional to said pressure, adjustable control means exerting a force opposing the force exerted by said diaphragm to produce a resultant force, a liquid filled diaphragm rigidly supported intermediate its ends and provided with a restriction to the flow of liquid from one end to the other interposed between said outlet pressure diaphragm and said control means.

2. A pressure control device, comprising, in combination, an inlet valve and a valve seat therefor, a waste valve and a valve seat therefor, said valves being mounted on a common valve stem with their respective valve seats so positioned as to make it impossible for them to open simultaneously, a diaphragm exposed to the outlet pressure of said device exerting a force proportional to said pressure, adjustable control means exerting a force opposing the force exerted by said diaphragm to produce a resultant force, a liquid filled diaphragm rigidly supported intermediate its ends and provided with a restriction to the flow of liquid from one end to the other interposed between said outlet pressure diaphragm and said control means for making the rate of change of valve openings proportional to the said resultant force to bring the output pressure to the desired constant value along a predetermined asymptotic curve.

3. A fluid pressure reducing device, comprising, in combination, an inlet valve communicating with a source of fluid at high pressure, a waste valve, means so interconnecting said valves as to make it impossible for them to be opened simultaneously, a pair of interconnected bellows filled with a non-compressible fluid secured at their point of interconnection to a fixed support and communicating with each other through a constricted opening, a diaphragm connected to the outlet of said device exerting a force on the free end of one of said bellows proportional to the output pressure of the device, a spring exerting a controllable force on the free end of the other of said bellows, the motion of the free end of one of said bellows positioning said inlet and waste valves in a manner to maintain the output pressure of said device substantially constant at a desired value, said desired value being determined by the force exerted by the said spring, which force is equal to that exerted by the said diaphragm when the output pressure is at the desired value.

4. Apparatus for controlling the flow of an elastic fluid from a source to a system to be maintained at a pressure below that of the supply pressure, comprising, in combination, valve means for controlling the flow of fluid from said source into said system, means proportionally responsive to the pressure in said system for actuating said valve means, adjustable means resiliently opposing the action of said responsive means, and a liquid filled diaphragm supported intermediate its ends and provided with a restriction to the flow of liquid from one end to the other interposed between said responsive means and said resilient means to retard the motion of said valve means to an extent sufficient to prevent "singing."

5. Apparatus for controlling the flow of an elastic fluid from a source to a system to be maintained at a pressure below that of the supply pressure, comprising, in combination, valve means for controlling the flow of fluid from said source into said system, means proportionally responsive to the pressure in said system for actuating said valve means, adjustable means resiliently opposing the action of said responsive means, hydraulic means for retarding the movement of said valve means, and means for adjusting the relation between said responsive means and said hydraulic means.

6. Apparatus for controlling the flow of an elastic fluid from a source to a system to be maintained at a pressure below that of the supply pressure, comprising, in combination, valve means for controlling the flow of fluid from said source into said system, means proportionally responsive to the pressure in said system for actuating said valve means, adjustable means resiliently opposing the action of said responsive means, a liquid-filled diaphragm having restriction means intermediate its ends for retarding flow of liquid from one end to the other of said diaphragm, means for mounting said diaphragm to cause relative movement between said restriction means and said ends in response to pressure difference between said responsive means and said resilient means, said relative movement being retarded by said restriction means and thereby acting to retard movement of said responsive means and so the movement of said valve means.

7. Apparatus for controlling the flow of an elastic fluid from a source to a system to be maintained at a pressure below that of the supply pressure, comprising, in combination, valve means for controlling the flow of fluid from said source into said system, means proportionally responsive to the pressure in said system for actuating said valve means, adjustable means resiliently opposing the action of said responsive means, a liquid-filled diaphragm having restriction means intermediate its ends and retarding flow of liquid from one end to the other of said diaphragm, means for mounting said diaphragm to cause relative movement between said restriction means and said ends in response to pressure difference between said responsive means and said resilient means, said relative movement being retarded by said restriction means and thereby acting to retard the movement of said responsive means and so the movement of said valve means, and means for limiting the relative movement of said restriction means and said ends.

8. Control apparatus for controlling the application of fluid from a high pressure source to a system to be filled with said fluid at a substantially constant pressure lower than that of the supply pressure, comprising, in combination, an inlet valve controlling the flow of said fluid from said source into said system, a waste valve controlling the flow of said fluid out of said system, said valves being interconnected in a manner to prevent their being opened simultaneously, means exerting a force proportional to the pressure in said system, adjustable means exerting a controlling force acting to oppose the force exerted by said last-named means whereby a resultant force is produced, and means for retarding the movement of said valves comprising a fluid-filled diaphragm provided with a restriction for retarding flow of fluid from one end to the other end thereof.

9. Control apparatus for controlling the application of an elastic fluid from a high pressure source to a system to be filled with said fluid and maintained at a control point pressure lower than that of the supply pressure, comprising, in combination, inlet valve means controlling the flow of said fluid from said source into said system, waste valve means controlling the flow of said fluid out of said system, said valve means being interconnected in a manner to prevent their being opened simultaneously, means exerting a force proportional to the pressure in said system for mechanically actuating said valve means, adjustable means for adjusting the force exerted by said last-named means and thereby adjusting said control point, and hydraulic means for retarding the movement of said inlet valve means and said waste valve means.

10. In apparatus for controlling the flow of fluid from a source to a system to be maintained at a pressure below that of the supply pressure, in combination, valve means for controlling the flow of fluid from said source to said system, means proportionally responsive to the pressure in said system for mechanically actuating said valve means, a liquid filled bellows having a movable portion operatively connected with said valve means and having a stationary portion, a restricted passage for restricting flow of liquid to and from said bellows whereby relative movement between said movable and stationary portions is retarded, said restricted relative movement through said operative connection serving to retard movement of said valve means by said responsive means, and adjustable means for changing the action of said responsive means to change the pressure maintained by said apparatus in said system.

11. Control apparatus for controlling the application of a fluid from a high pressure source to a system to be filled with said fluid at a substantially constant pressure lower than that of the supply pressure, comprising, in combination, inlet valve means controlling the flow of said fluid from said source into said system, waste valve means controlling the flow of said fluid out of said system, means interconnecting said inlet valve means and said waste valve means, means proportionally responsive to the pressure in said system for directly and mechanically moving said valve means, means for retarding the movement of said valve means comprising a liquid filled bellows provided with a restricted passage for retarding flow of liquid to and from said bellows, and adjustable means for changing the action of said proportionally responsive means to change the pressure maintained by said apparatus in said system.

CLESSON E. MASON.